United States Patent
Ramsey et al.

(10) Patent No.: US 7,328,199 B2
(45) Date of Patent: Feb. 5, 2008

(54) COMPONENTIZED SLOT-FILLING ARCHITECTURE

(75) Inventors: William D. Ramsey, Redmond, WA (US); Jianfeng Gao, Redmond, WA (US); Sanjeev Katariya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 40 days.

(21) Appl. No.: 11/246,847

(22) Filed: Oct. 7, 2005

(65) Prior Publication Data

US 2007/0094185 A1  Apr. 26, 2007

(51) Int. Cl.
*G06N 5/00* (2006.01)
(52) U.S. Cl. ............................ 706/45; 704/4; 715/716; 726/26
(58) Field of Classification Search .................. 386/8; 704/1, 9, 4; 706/45; 715/716; 726/26
See application file for complete search history.

(56) References Cited

U.S. PATENT DOCUMENTS

| | | | |
|---|---|---|---|
| 4,736,296 A | | 4/1988 | Katayama et al. |
| 4,965,763 A | * | 10/1990 | Zamora .................. 704/1 |
| 5,208,816 A | | 5/1993 | Seshardi et al. |
| 5,477,451 A | * | 12/1995 | Brown et al. ............ 704/9 |
| 5,625,814 A | | 4/1997 | Luciw |
| 5,636,036 A | * | 6/1997 | Ashbey .................. 386/8 |
| 5,748,974 A | | 5/1998 | Johnson |
| 5,892,900 A | * | 4/1999 | Ginter et al. ........... 726/26 |
| 6,118,939 A | | 9/2000 | Nack et al. |
| 6,212,494 B1 | | 4/2001 | Boguraev |
| 6,278,996 B1 | | 8/2001 | Richardson et al. |
| 6,690,390 B1 | | 2/2004 | Walters et al. |
| 6,850,252 B1 | * | 2/2005 | Hoffberg ............... 715/716 |
| 6,901,399 B1 | | 5/2005 | Corston et al. |
| 6,904,402 B1 | | 6/2005 | Wang et al. |
| 6,910,003 B1 | * | 6/2005 | Arnold et al. ............ 704/4 |
| 2002/0042793 A1 | | 4/2002 | Choi |

(Continued)

FOREIGN PATENT DOCUMENTS

WO  01029823 A1  4/2001

(Continued)

OTHER PUBLICATIONS

International Search Report dated Mar. 29, 2007, mailed Mar. 30, 2007, for International Application No. PCT/US2006/044418, 3 pages.

(Continued)

*Primary Examiner*—Wilbert L Starks, Jr.
(74) *Attorney, Agent, or Firm*—Amin, Turocy & Calvin, LLP

(57) ABSTRACT

The subject disclosure pertains to systems and methods for performing natural language processing in which tokens are mapped to task slots. The system includes a mapper component that generates a lattice representing possible interpretations of the tokens, a decoder component that creates a ranked list of paths traversing the lattice, a scorer component that generates scores used to rank paths and post-processing components that format the paths for use by other software. Each of these components may be independent, such that the component may be modified or replaced without affecting the remaining components. This allows a variety of different mathematical models and algorithms to be tested or deployed without requiring changes to the remainder of the system.

20 Claims, 13 Drawing Sheets

U.S. PATENT DOCUMENTS

| | | | |
|---|---|---|---|
| 2002/0045463 | A1 | 4/2002 | Chen et al. |
| 2002/0065959 | A1 | 5/2002 | Kim et al. |
| 2002/0124115 | A1 | 9/2002 | McLean et al. |
| 2002/0143949 | A1 | 10/2002 | Rajarajan et al. |
| 2002/0152190 | A1 | 10/2002 | Biebesheimer et al. |
| 2003/0084035 | A1 | 5/2003 | Emerick |
| 2003/0120700 | A1 | 6/2003 | Boudnik et al. |
| 2004/0030556 | A1 | 2/2004 | Bennett |
| 2004/0030710 | A1 | 2/2004 | Shadle |
| 2004/0034652 | A1 | 2/2004 | Hofmann et al. |
| 2004/0111419 | A1 | 6/2004 | Cook et al. |
| 2004/0117395 | A1 | 6/2004 | Gong et al. |
| 2004/0130572 | A1 | 7/2004 | Bala |
| 2004/0250255 | A1 | 12/2004 | Kraiss et al. |
| 2005/0028133 | A1 | 2/2005 | Ananth et al. |
| 2005/0034098 | A1 | 2/2005 | DeSchryver et al. |
| 2005/0049852 | A1 | 3/2005 | Chao |
| 2005/0049874 | A1 | 3/2005 | Coffman et al. |
| 2005/0065995 | A1 | 3/2005 | Milstein et al. |
| 2005/0075859 | A1 | 4/2005 | Ramsey |
| 2005/0075878 | A1 | 4/2005 | Balchandran et al. |
| 2005/0078805 | A1 | 4/2005 | Mills et al. |
| 2005/0080625 | A1 | 4/2005 | Bennett et al. |
| 2005/0080782 | A1 | 4/2005 | Ratnaparkhi et al. |
| 2005/0114854 | A1 | 5/2005 | Padisetty et al. |
| 2005/0131672 | A1 | 6/2005 | Dalal et al. |
| 2005/0132380 | A1 | 6/2005 | Chow |

FOREIGN PATENT DOCUMENTS

| | | |
|---|---|---|
| WO | 03001413 A1 | 1/2003 |
| WO | WO 2004/017230 A1 | 2/2004 |
| WO | WO 2005/036365 A2 | 4/2005 |

OTHER PUBLICATIONS

U.S. Appl. No. 11/270,393, filed Nov. 9, 2005, Ramsey et al.
U.S. Appl. No. 11/290,076, filed Nov. 30, 2005, Ramsey et al.
U.S. Appl. No. 11/270,407, filed Nov. 9, 2005, Ramsey et al.
U.S. Appl. No. 11/294,581, filed Dec. 5, 2005, Yao et al.
U.S. Appl. No. 11/294,262, filed Dec. 5, 2005, Ramsey et al.
U.S. Appl. No. 11/294,265, filed Dec. 5, 2005, Ramsey et al.

"DTS: Programming: Creating the Custom Task Framework", 1 page, accessible at: http://msdn.microsoft.com/library/default.asp?url=/library/en-us/dtsprog/dtspcusttskc_3hwr.asp, last accessed Jan. 5, 2006.

Ernst, et al., "A Task Framework for the Web Interface W2H", Bioinformatics, 2003, pp. 278-282, vol. 19, No. 2, Oxford University Press.

Multi-Agent Systems Lab, "TAEMS: A Framework for Task Analysis, Environment Modeling, and Simulation", 3 pages, acessible at: http://dis.cs.umass.edu/research/taems/, last accessed Jan. 5, 2006.

Hochberg, et al., "A Flexible Framework for Developing Mixed-Initiative Dialog Systems", Association for Computational Linguistics, Proceedings of the Third SIGdial Workshop on Discourse and Dialogue, Jul. 2002, pp. 60-63, Philadelphia.

AgileTek, "Componentized Architecture", 2 pages, accessible at: http://www.agiletek.com/agileplus#CompArchitecture, last accessed Jan. 5, 2006.

H. Lieberman, et al., "Instructible Agents: Software That Just Keeps Getting Better", IBM Systems Journal, 1996, pp. 539-556, vol. 35, Nos. 3 and 4.

"Technical Forum: Machine Intelligence and the Turing Test", IBM Systems Journal, 2002, pp. 524-539, vol. 41, No. 3.

O. Conlan, et al., "Applying Adaptive Hypermedia Techniques to Semantic Web Service Composition", In Proceedings of AH 2003: Workshop on Adaptive Hypermedia and Adaptive Web-based Systems, 2003, pp. 53-62.

H. Liu, et al., "GOOSE: A Goal-Oriented Search Engine with Commonsense", Adaptive Hypermedia and Adaptive Web-Based Systems, Second International Conference, AH 2002, Malaga, Spain, May 29-31, 2002, Lecture Notes in Computer Science, pp. 253-263, No. 2347.

Leon Peshkin, "Research Statement", 2 pages, accessible at: http://people.csail.mit.edu/pesha/my_res.pdf, last accessed Jan. 5, 2006.

Korns Associates "Our Intelligent Agents", 4 pages, accessible at: http://www.korns.com/technology.htm, last accessed Jan. 5, 2006.

V. Chepegin, et al., "CHIME: Service-Oriented Framework for Adaptive Web-Based Systems", in Paul De Bra (ed): Proceedings of Dutch national conference InfWet, Eindhoven, the Netherlands, Nov. 20, 2003, pp. 29-36.

Esposito, Dino. "Browser Helper Objects:The Browser the Way You Want It." Microsoft Corporation, Jan. 1999, 12 pages.

\* cited by examiner

COMPONENTIZED SLOT-FILLING ARCHITECTURE

BACKGROUND

Human languages are rich and complicated, including huge vocabularies with complex grammar and contextual meaning. The same thought or meaning can be expressed in a multiplicity of ways. In contrast, most machines or software applications require data to be input following very specific rules. Human operators or users can find these rigid rules frustrating. In addition, machine interfaces are frequently designed based upon the way in which the data will be utilized by the machine rather than based upon the operator's point of view. Consequently, operators may find machine interfaces counterintuitive or awkward. Operators may be required to spend time learning and adapting to the machine interface. Where the operator is a customer of a business employing the machine, this wasted time may be particularly frustrating and costly.

Some machines and/or software applications attempt to interpret human or natural language input to derive the input data required by the machine. However, machine interpretation of human language, even in a very limited way, is an extremely complex task and continues to be the subject of extensive research. Providing operators with the ability to communicate their desires to an automated system without requiring users to learn a machine specific language or grammar would decrease learning costs and greatly improve system usability. However, operators become quickly frustrated when automated systems and machines are unable to correctly interpret user input, leading to unexpected results.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns systems and methods for performing natural language processing in which tokens are mapped to task slots. The system includes a mapper component that generates a lattice representing possible interpretations of the tokens, a decoder component that creates a ranked list of paths traversing the lattice, a scorer component that generates scores used to rank paths and post-processing components that format the paths for use by other software. Each of these components may be independent, such that the component may be modified or replaced without affecting the remaining components. This allows a variety of different mathematical models and algorithms to be tested or deployed without requiring changes to the remainder of the system.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
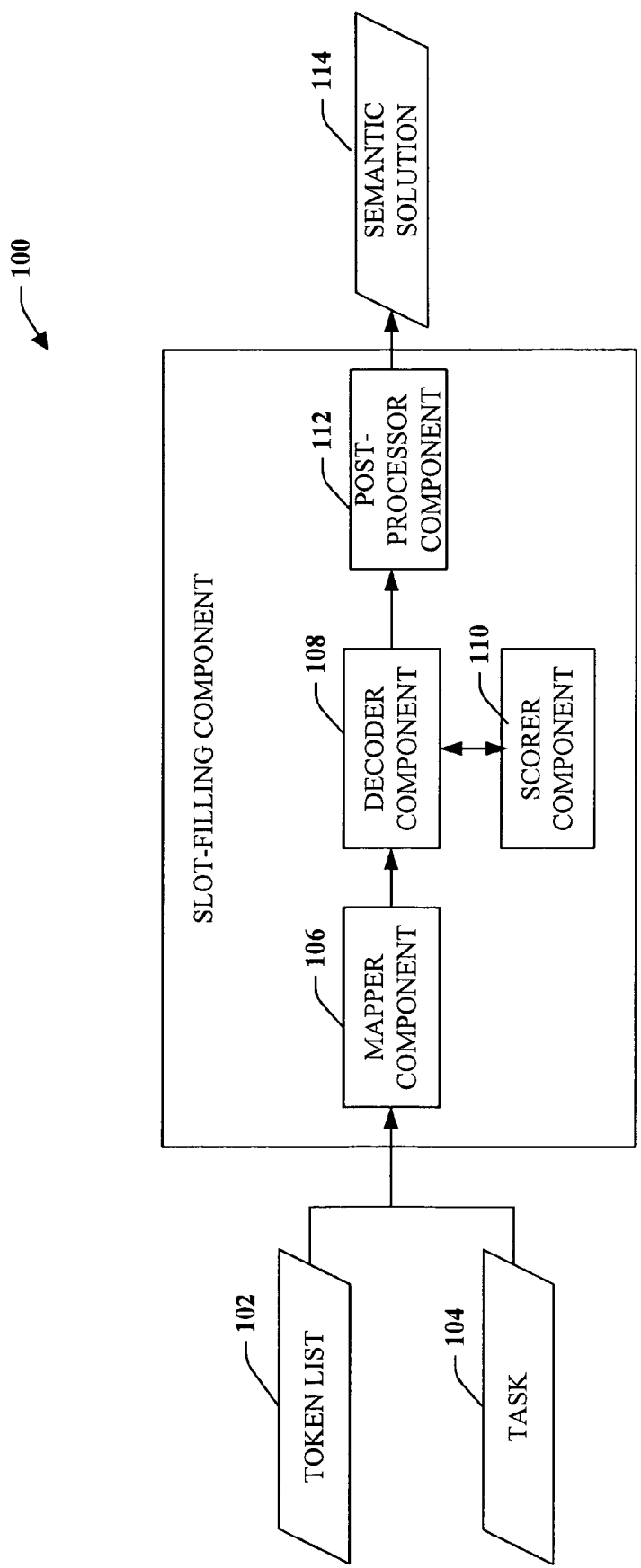
FIG. 1 is a block diagram of a slot-filling architecture in accordance with an aspect of the disclosed subject matter.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. In addition, while the examples provided utilize the C# programming language, numerous alternative programming languages may be used.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

I. System Overview

In general, semantic analysis attempts to match natural language input to certain tasks or actions provided by an automated system. Typically, semantic processing breaks the natural language input into strings of characters called tokens. The automated system can analyze the tokens as well as the user context to determine the appropriate task. The user context may include any information that indicates the user's current state, such as recent user actions, any software applications active on the user's computer or any other information indicative of the user's state.

A task may require information from the natural language input. Frequently, tasks include slots that provide information about how to conduct the task. For example, an airline reservation system can include a "Book Flight" task, where the Book Flight task includes slots for the arrival and departure cities, the arrival and departure dates, and the number of passengers. The information required for those task slots can be retrieved from a natural language input (e.g., "I want a flight from Boston to Seattle with 2 passengers leaving on May 8, 2005 and returning on May 25, 2005"). In another example, a word processing application can include a "Create Table" task having slots for the number of rows and columns and a line style. Those slots can receive values from the natural language input (e.g., "Insert a 2 by 4 table with dotted lines"). A task slot is a holder for piece of data or information that may be retrieved from the natural language input.

Determining possible mappings from natural language input to the appropriate task slots is a complex problem that may be solved using a variety of different mathematical techniques. Conventional techniques include Hidden Markov Models (HMM), Maximum Entropy/Minimum Divergence Models (MEMD), Naïve Bayes (NB), and heuristic (i.e. rule-based) approaches. Many techniques utilize a searching or decoding strategy (e.g., a Viterbi search, Beam search, A* search or other algorithm) to determine the best solution out of a set of possible solutions.

FIG. 1 illustrates a slot-filling system 100 in accordance with an aspect of the disclosed subject matter. Prior to processing by the slot-filling system 100, natural language input has been tokenized and an appropriate task has been selected. The slot-filling system is now responsible for providing the best matching of the list of tokens from the natural language input with the task parameters. The slot-filling system is designed to facilitate experimentation with various mapping, decoding, and scoring algorithms. In one aspect, the slot-filling system architecture includes independent, easily replaceable components having standard interfaces. Consequently, the system is capable of combining, modifying and replacing mathematical models (e.g., hidden markov models (HMM), maximum entropy/minimum divergence models (MEMD), Naïve Bayes (NB) and heuristics), search algorithms (e.g., Beam search, Viterbi search and A* search), and mapping schemes (e.g., annotations, learning, named-entity recognizers) used by the system without affecting other system components.

The slot-filling system 100 can receive a list of tokens 102 and one or more tasks 104. The slot-filling system 100 can include a mapper component 106 that receives the token list 102 and one of the tasks 104. The mapper component 106 may utilize the tokens within the token list 102 and data related to the task 104 to construct a lattice. A lattice, as used herein, is a data structure that includes possible interpretations for the tokens contained within the token list 102. A decoder component 108 determines one or more paths through the lattice generated by the mapper component 106. A path, as used herein, includes a single interpretation for each token utilizing a token only once to effectively create a path from one edge of the lattice to the other. The decoder component 108 can utilize a scorer component 110 to rank a list of possible paths generated by the decoder component 108 or to determine the best path or paths through the lattice. The scorer component 120 uses a mathematical model, algorithm or function to calculate a score or rank for one or more paths generated by the decoder component 108.

The system may also include a post-processor component 112 that utilizes the one or more paths generated by the decoder component 110 to generate a list of semantic solutions 114. A semantic solution is a representation of a path that can be used by downstream applications including the task. In addition, the semantic solution can be more easily read by a user than the raw path data and may be presented to the user for verification. The semantic solution can be presented either as simple text or in a graphics display highlighting the semantic structure.

In one aspect of the subject matter presented herein, a set of interfaces for the slot-filler system, its components and data structures are defined, such that individual components may be replaced. The interfaces allow the system to replace components and incorporate new or modified scoring, search, mapping and post-processor components without having to change the remainder of the system. This componentized architecture provides for rapid experimentation and research. In addition, once a system is deployed, a user or operator can modify the underlying mathematical models of the slot-filling system by swapping out certain components without performing a complete overhaul of the system.

Possible implementations of a slot-filling system are described in detail below. The exemplary software code presented below is coded in the C# programming language. However, the slot-filling system and methods are not limited to the C# language. Any suitable programming language or method may be utilized to implement the slot-filling system.

To provide for ease in replacing system algorithms and functions, the slot-filling system 100 supports a separate mapper component 106, decoder component 108, scorer component 110 and post-processor component 112. Consider the following exemplary interface for the slot-filling system:

```
public interface ISlotFiller
{
    IMapper Mapper {get;set;}
    IDecoder Decoder {get;set;}
    IScorer Scorer {get;set;}
    IGlobalRecognizers GlobalRecognizers {get;set;}
    void Process(string input,
        System.Globalization.CultureInfo culture, IList tokens,
IList namedEntities, ITask task, int numOutput, ArrayList
semanticSolutions);
};
```

Here, the Mapper, Decoder and Scorer properties provide for separate, independent mapper, decoder and scorer components, respectively. GlobalRecognizers provides the ability to recognize tokens that have special meaning to the slot filling system. For example, the token "Boston" has special meaning as the city of Boston, Massachusetts. The GlobalRecognizers property provides a set of recognizer components that identify special tokens, making them available throughout the entire system and across multiple tasks. For example, there may be several tasks that utilize "city," "date" or "number" entities. Entities are a mechanism for providing type information. For example, the "city" entity includes a set of annotations (e.g., "city," "place," and "town"). Occurrences of the annotations within the list of tokens indicate the likelihood of a "city" entity. GlobalRecognizers allows such entities or special tokens to be defined once rather than for each individual task.

The slot-filler interface includes a Process method responsible for taking the natural language input, culture information, a list of tokens, a list of named entities, a task and a maximum number of desired solutions. Culture information can include information such as the writing system and formatting utilized by the relevant culture. Named entities identify tokens with a specific meaning to the slot-filling system (e.g., Boston). The Process method produces a list of up to the maximum number of requested semantic solutions.

As described above, the slot-filling system can include easily replaceable components. The system provides for modifying, replacing or combining various mathematical models or algorithms for semantic analysis. This allows software developers to quickly switch algorithms utilized and could decrease testing time, thereby speeding the development of natural language processing systems. In addition, users can modify the slot-filling system to optimize a natural language processing system to meet their specific needs.

II. Mapper Component

Figure 2:
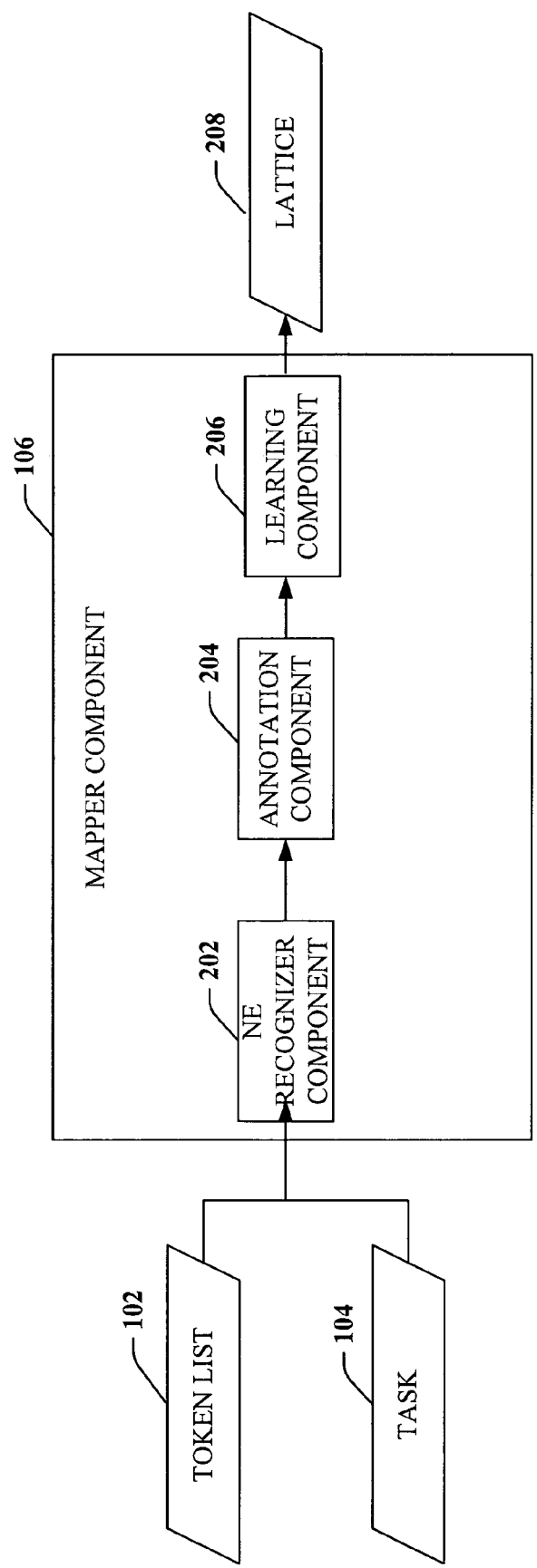
FIG. 2 is a block diagram of a mapper component in accordance with an aspect of the disclosed subject matter.

FIG. 2 illustrates a mapper component 106 in accordance with an aspect of the disclosed subject matter. The mapper component 106 receives a token list 102 and a task 104 as input. The task 104 may include certain metadata used to interpret the token list. For example, the task 104 may include a list of named entities specific to the task. The mapper component 106 produces a lattice that corresponds to all possible ways in which query used to generate the token list 102 can be mapped to a task schema for the task 104. The lattice is composed of lattice fragments, where each token of the token list 102 is mapped to one or more lattice fragments. A fragment, as used herein, is a portion of a lattice related to a token or group of tokens. For example, for a query such as "flight to New York City," the tokens "New," "York" and "City" can be mapped to a single fragment. A fragment or node is created for every possible interpretation of a token or group of tokens based upon the token list and task data.

The mapper component 106 may include one or more named entity (NE) recognizer components 202. Named entity information from the task 104 metadata may be used by the NE recognizer component 202. The NE recognizer component is capable of matching tokens to entries in a set of known tokens. The NE recognizer is capable of recognizing tokens that have specific meaning to the slot-filler system. NE recognizer components may be general or may be specific to a certain category of tokens. For example, a city NE component may include a list of names (e.g., Seattle, Boston). Similarly, a date NE recognizer may be capable of recognizing and interpreting dates, such as "Jun. 14, 2005."

The mapper component may also include an annotation component 204. An annotation component 204 identifies tokens that mark or indicate the significance of other tokens. The annotation component 204 may recognize system defined annotations as well as task specific annotations included in the task metadata. For example, the token "from" when contained within a natural language input string maps to a "Book flight" task indicates that the token that follows is likely to contain the name of the destination city. The annotation component 204 identifies an annotation token and uses that information to interpret other tokens within the token list.

In addition, the mapper component 106 may include a learning component 206. The mapper component 106 may receive user feedback, whether explicit user feedback such as rankings or ratings of mapping results or implicit feedback based upon user actions. The learning component 206 may utilize this user feedback to determine mappings for future token lists. Consequently, the mapper component 106 is able to utilize both developer-generated interpretation (such as named entities and annotations) and machine-generated interpretation (e.g., learned interpretations).

The mapper component 106 uses the fragments generated by the NE recognizer component 202, the annotation component 204 and the learning component 206 to create a lattice. Consider the following exemplary declaration of an interface for the mapper component:

```
public interface IMapper
{
    ILattice ProduceLattice(IList tokens, ITask task,
        IGlobalRecognizers
    globalRecognizer, IList nes);
};
```

Here, the IMapper interface produces a lattice from a list of tokens, a task, a set of global recognizers and a list of named entities. The IMapper method, ProduceLattice, loads the task metadata, calls various NE recognizers and maps annotations to generate a set of fragments. The ProduceLattice method assembles the fragments to create a lattice.

Figure 3:
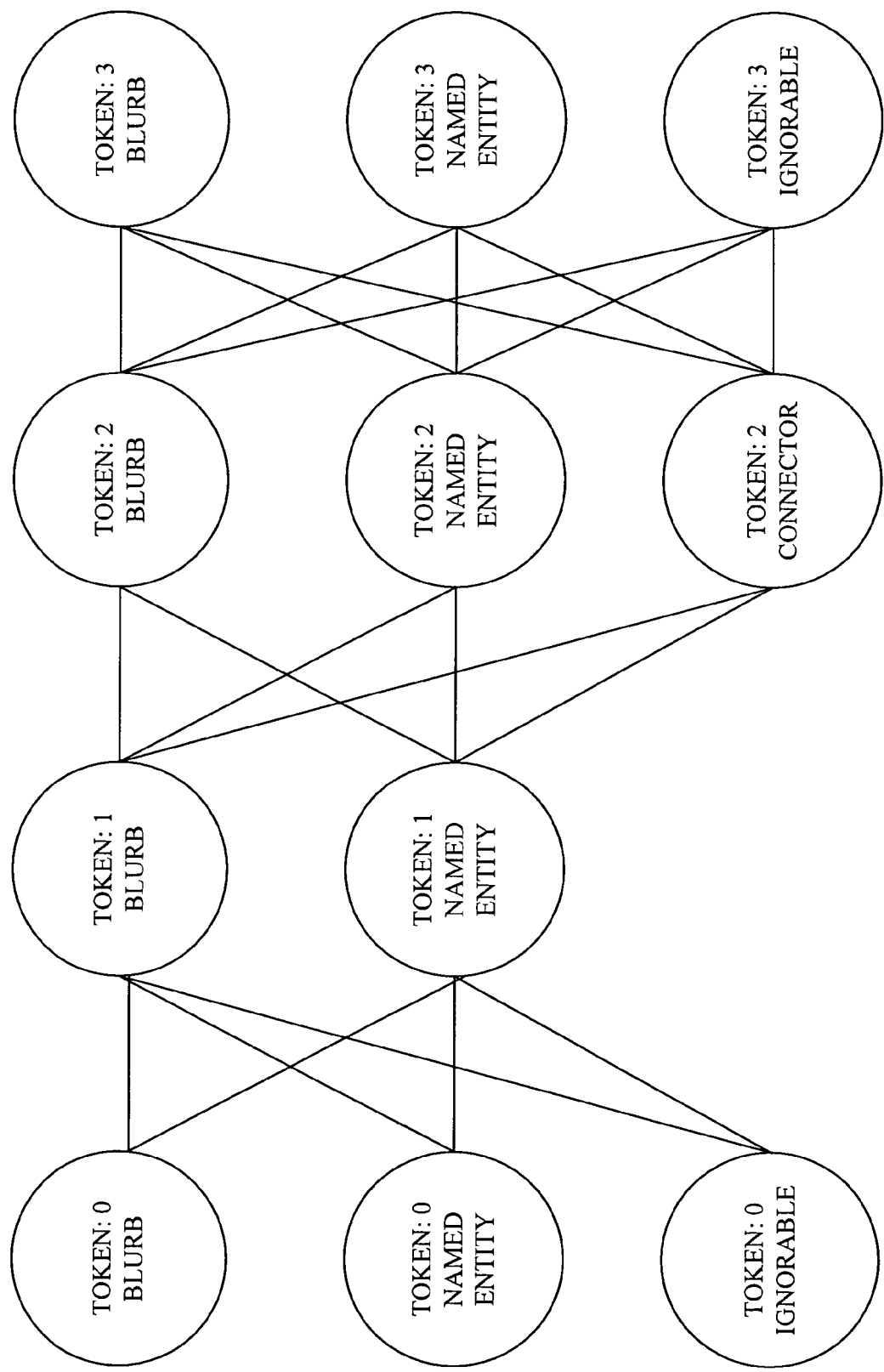
FIG. 3 is an illustration of a lattice data structure in accordance with an aspect of the disclosed subject matter.

Referring now to FIG. 3, the mapper component utilizes the token list, task metadata and the like to create a lattice that includes all possible interpretations of the token list for the given task. FIG. 3 is a graphical representation of a lattice data structure. For each token input into the mapper component, one or more fragments are generated. A separate fragment for the token is created for each possible token type. Each circle represents a fragment or node corresponding to a possible interpretation of a token. The first column of nodes corresponds to three possible interpretations of the first token in the token list, token 0. The second column corresponds to two possible interpretations of the second token in the token list, token 1, and so forth. The lines connecting the nodes represent possible paths through the lattice.

The lattice data structure can be used to represent all possible interpretations of the tokens generated from a natural language string based upon a specific task. For example, the natural language query "folder desktop last week" may be separated into the following token list: "folder," "desktop," "last" and "week." One possible interpretation of this query includes a search for the words "folder," "desktop," "last" and "week." Consider the exemplary implementation of a lattice for the "folder desktop last week" query generated using a desktop search task:

Lattice for: "folder desktop last week"

Token 0 (Folder):

```
<type=Ignorable, beginSpanToken=0, endSpanToken=1, path=NULL,
restr=none>
<type=Blurb, beginSpanToken=0, endSpanToken=1, path=NULL,
restr=none>
<type=PreAnnotation, beginSpanToken=0, endSpanToken=1, path=String-
DisplayFolder-Item, restr=none>
<type= NamedEntity, beginSpanToken=0, endSpanToken=1, path=Kind-
(null)-Item, restr='(Contains(PerceivedType,'folder') RANK BY
COERCIONS(Absolute, 1000))'>
```

Here, four possible interpretations or fragments are created for token 0. As illustrated above, the fragments are self-describing. The fragment information includes the type of token, described in detail below. BeginSpanToken and endSpanToken define the position of the token within the string as well as the length of the token. For all of the fragments shown above "folder" appeared in the first position, denoted by a zero, and ended at the second position, denoted by a one. It is possible for tokens to include multiple words of text as shown below with respect to Token 2. The path describes where the fragment maps to the task schema. Finally, restr stands for the restriction value, which is the machine form of the token. For example, the user may input a string including the token "Boston". However, the task may utilize airport codes. In this example, the restriction for the token "Boston" would be "BOS" for Boston Logan International Airport. The remainder of the lattice includes the tokens "desktop last week":

Token 1 (Desktop):

```
public enum FragmentType
{
    Blurb,
    Modifier,
    Connector,
    OpenParen,
    CloseParen,
    NamedEntity,
    Ignorable,
    FullyIgnorable,
    PreAnnotation,
    PostAnnotation,
    EntityIndicator,
};
```

Token 2 (Last):

```
<type=Ignorable, beginSpanToken=1, endSpanToken=2, path=NULL,
restr=none>
<type=Blurb, beginSpanToken=1, endSpanToken=2, path=NULL,
restr=none>
<type= NamedEntity, beginSpanToken=1, endSpanToken=2,
path=KnownStore-(null)-Item, restr=''>
```

Here, the final fragment for Token 2 begins at the third position, denoted by two but ends at the fifth position, denoted by four. This indicates that two tokens taken together make up this fragment.

Token 3 (Week):

```
<type=Ignorable, beginSpanToken=2, endSpanToken=3, path=NULL,
restr=none>
<type=Blurb, beginSpanToken=2, endSpanToken=3, path=NULL,
restr=none>
<type= NamedEntity, beginSpanToken=2, endSpanToken=4,
path=DateTime-(null)-Item, restr='R00UUUUUUUUW-1WNN'>
```

In one aspect, token types may be defined using an enumerated type. Consider the following exemplary token or fragment types:

```
<type=Ignorable, beginSpanToken=3, endSpanToken=4, path=NULL,
restr=none>
<type=Blurb, beginSpanToken=3, endSpanToken=4, path=NULL,
restr=none>
```

Here, Blurb type indicates that the token contains an unrestricted text string. The Modifier type indicates that the token has been identified as a task slot constraint, such as "not" or "less than." The Connector type indicates that the token is a logical connector, such as "and," "or" and "nor." The OpenParen and CloseParen types indicate that the token is either an open or close parenthesis, respectively. The NamedEntity type tokens are tokens that have a special meaning, as discussed in detail above. The Ignorable and FullyIgnorable types indicate that the token has no specific meaning to the task. A distinction is made between ignorable and fully ignorable because certain tasks utilize every word or token (e.g., the search task). For such tasks, Ignorable type tokens, which are usually ignored, are utilized. However, FullyIgnorable tokens are not utilized for any task, including the search task. For example, the query "frm: bill" should not include "frm:" in a search, because "frm:" is an annotation. The Pre-annotation and post-annotation types indicate that the value of a token preceding or following the current token is to be used to fill a slot in the task. For example, a send email task may utilize the preannotation "from:" or "frm:" to indicate that the next token should fill the slot for the name of the sender. Finally, the EntityIndicator type indicates an entity type, such as email or meeting. The exemplary structure is used to classify tokens. However, many additional or alternative classifications may be utilized.

III. Decoder Component

Figure 4:
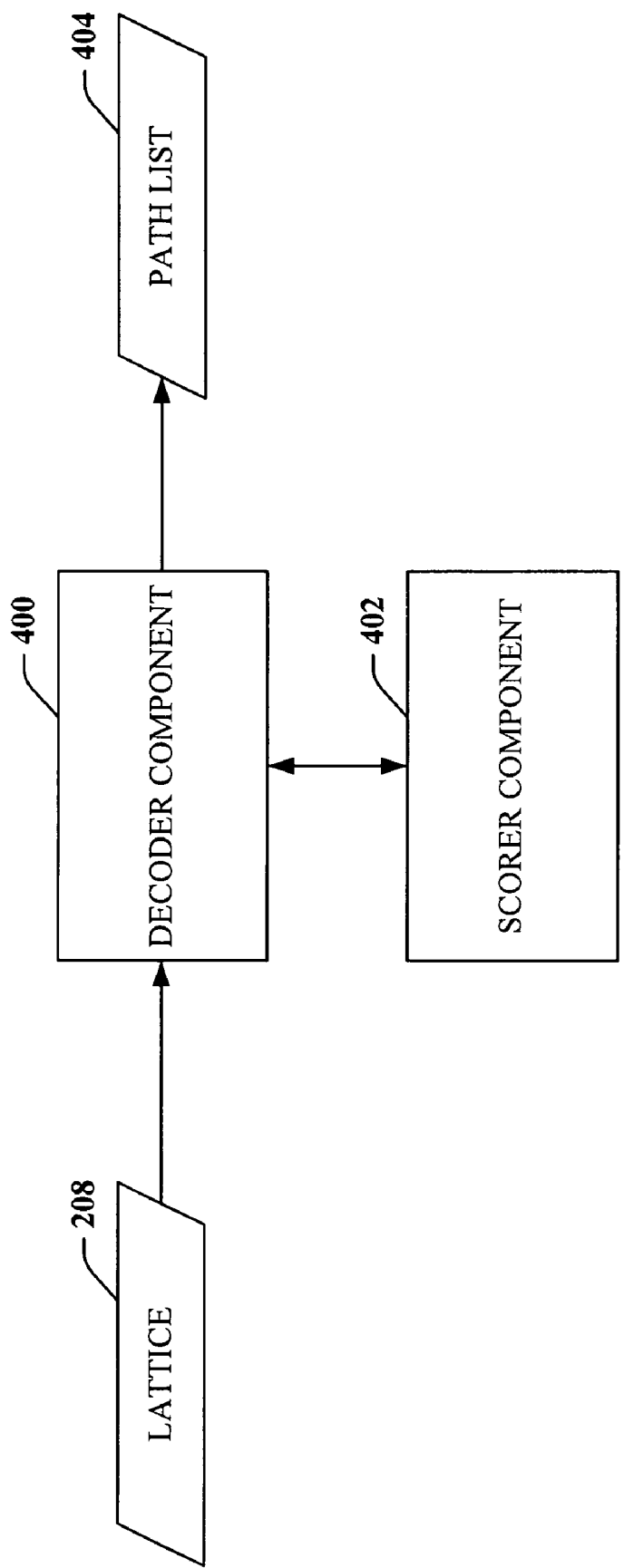
FIG. 4 is an illustration of a decoder component and scorer component in accordance with an aspect of the disclosed subject matter.

FIG. 4 illustrates a decoder component 400 and associated scorer component 402 in accordance with an aspect of the disclosed subject matter. The decoder component 400 receives the lattice 208 generated by the mapper component and outputs a list of one or more paths 404 that traverse the lattice 208. The decoder component can utilize a beam search, a Viterbi Search, an A* search, or any other suitable search algorithm. The decoder component can also combine search algorithms. Consider the following exemplary decoder component interface:

```
public interface IDecoder
{
    void Process(string input, IList tokens, ILattice
    lattice, IScorer scorer, ITask
task, int numOutput, IPathList pathlist);
};
```

Here, the decoder component interface provides a Process method that takes as its parameters an input string, the list of tokens, the lattice generated by the mapper component, the scorer component, the task into which the tokens are to be slotted, and the maximum number of paths to be output. The Process method output consists of a list of one or more ranked paths up to the maximum number of paths to be output.

A path consists of a set of fragments that describe a traversal of a lattice such that each token from the natural language input is utilized only once. In one or more embodiments, a path may be implemented as a group of path objects, where each path object includes a link to the preceding path object. Consider the following exemplary path interface:

```
public interface IPath
{
    IFragment Fragment {get;}
    IPath Previous {get;}
    double Score {get;set;}
    AttachmentStatus AttachmentStatus {get;}
};
public enum AttachmentStatus
{
    AttachedToLeft,
    AttachedToRight,
    AttachedOnLeft,
    AttachedOnRight,
    Undecided
}
```

Here, each path object fragment that interprets a token, an indicator of the previous path object, the score for the path and attachment status. Attachment status indicates a relationship with the token to either side of the current token. A set of path objects can constitute a path through the lattice. Consider the following exemplary path through the lattice for the natural language input "folder desktop last week":

Path Object (#1)

```
Fragment =<type= PreAnnotation, beginSpanToken=0, endSpanToken=1,
path=String-DisplayFolder-Item, restr=none>
Previous = null
AttachmentStatus = AttachedOnRight
```

Path Object (#4)

```
Fragment = <type=NE, beginSpanToken=1, endSpanToken=2,
path=KnownStore-(null)-Item, restr=''>
Previous = Path Object (#1)
AttachmentStatus = AttachedToLeft
```

Path Object (#8)

```
Fragment = <type=NE, beginSpanToken=2, endSpanToken=4,
path=DateTime-(null)-Item, restr='R00UUUUUUUW-1WNN'>
Previous = Path Object (#4)
AttachmentStatus = Undecided
```

Here, "Fragment" indicates the fragment or node selected as the interpretation of the current token utilized for the current path, "Previous" indicates the preceding path object and Attachment status indicates a relationship with the token to the left or right. In the example above, Path Object #1 is a preannotation type fragment for the "folder" token. Because the fragment is a preannotation, the PathObject #1 is attached to the token that follows it, "desktop." Consequently, PathObject #4 is attached to the preceding token. No such relationship has been determined for Path Object #8, therefore, the attachment status remains undecided. Each possible path consists of a set of path objects.

IV. Score Component

The decoder component generates a list of possible paths for the lattice and uses the scorer component to rank the possible paths, determining which paths to include in the path list 404 and in what order. The scorer component may utilize a heuristic scoring function, an HMM, a MEMD function, linear discriminative models, blending strategies or any other suitable algorithm or any combination thereof. The scorer component may require different input data depending upon the algorithm utilized. For example, a heuristic or HMM scoring function utilizes the current path and the list of tokens. However, the MEMD scoring function and linear descriptive models require the current path, the list of tokens and the lattice. In one or more embodiments, the scorer component interface is defined to include the maximum available input data to provide for the maximum number of scoring algorithms and functions. If the current scorer algorithm does not require all of the inputs, the excess input will be ignored. Consider the following exemplary interface definition:

```
public interface IScorer
{
    double ComputeScore(IPath path, bool isEnd, Ilist tokens, ILattice
    lattice) ;
};
```

Here, the scorer component provides a ComputeScore method that receives a path, a list of tokens, a lattice as parameters. While not every algorithm may require lattice information, the above interface is designed to provide the best available information and allow use of the maximum number scoring algorithms. The ComputeScore method calculates a score for each path and inserts that score into the score property of the path.

The scorer component is independent from the decoder component. This allows the scorer component to be replaced or modified without affecting the decoder component or in fact any other component in the slot-filling system. This independence increases the flexibility of the slot-filling system.

V. Post-Processor Component

Figure 5:
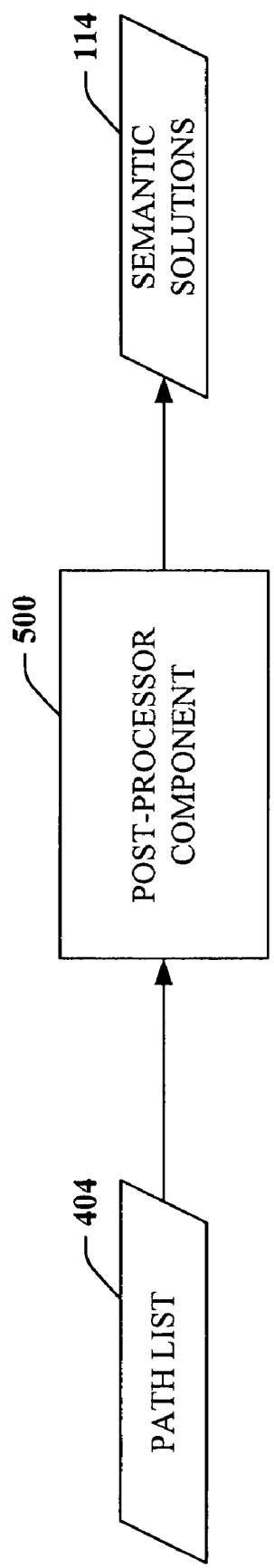
FIG. 5 is an illustration of a post-processor component in accordance with an aspect of the disclosed subject matter.

FIG. 5 illustrates a post-processor component 500 in accordance with an aspect of the disclosed subject matter. The post-processor component 500 receives a pathlist 404 as input and produces a list of semantic solutions 114. The semantic solutions 114 represent one or more paths in a form that can be used by other applications, including the task. In addition, users may find a path consisting of a list of nodes difficult to read. Semantic solutions can be used to present path information to a user in a more manageable manner.

The pathlist 404 may include one or more paths through the lattice. The paths may be long and complex depending upon the natural language input to the slot-filling component. The system may handle complex objects, allowing users to express concepts such as "email from Bill or Jun and to John not Sanjeev sent before last week." The post-processor component 500 can provide a semantic solution. This data structure allows clients to specify complicated expressions including nested clauses, negated clauses, qualifiers and so forth such as:

((A||B) && !(C && D))||(E>F)

Consider the following exemplary interface for a semantic solution:

```
public interface ISemanticSolution
{
    double Score {get;}
    IList Conditions {get;}
}
```

Here, the semantic solution includes the score generated by the scorer component and a list of semantic conditions. The list of semantic conditions can be implemented as a tree structure. Consider the following exemplary semantic condition interface:

```
public interface ISemanticCondition
{
    string Connector{get;}
    string Modifier{get;}
    ISemanticCondition Parent{get;}
    IList Children{get;}
    IList Values{get;}
    ISlot Slot {get;}
    int BeginActualToken{get;}
    int EndActualToken{get;}
}
```

Here, the semantic conditions include a parent semantic condition as well as any semantic condition children to implement a tree structure. The semantic condition data structure also provides for logical connectors (e.g., "and" or "or") and modifiers (e.g. "less than", "before", ">", "not" and the like). BeginActualToken and EndActualToken properties indicate the token or tokens used to generate the semantic condition. For example, "last week" consists of two words or tokens, but is used to generate a single semantic condition. The Values property contains a list of values for the semantic condition and the Slot property indicates the task slot associated with the semantic condition.

Figure 6:
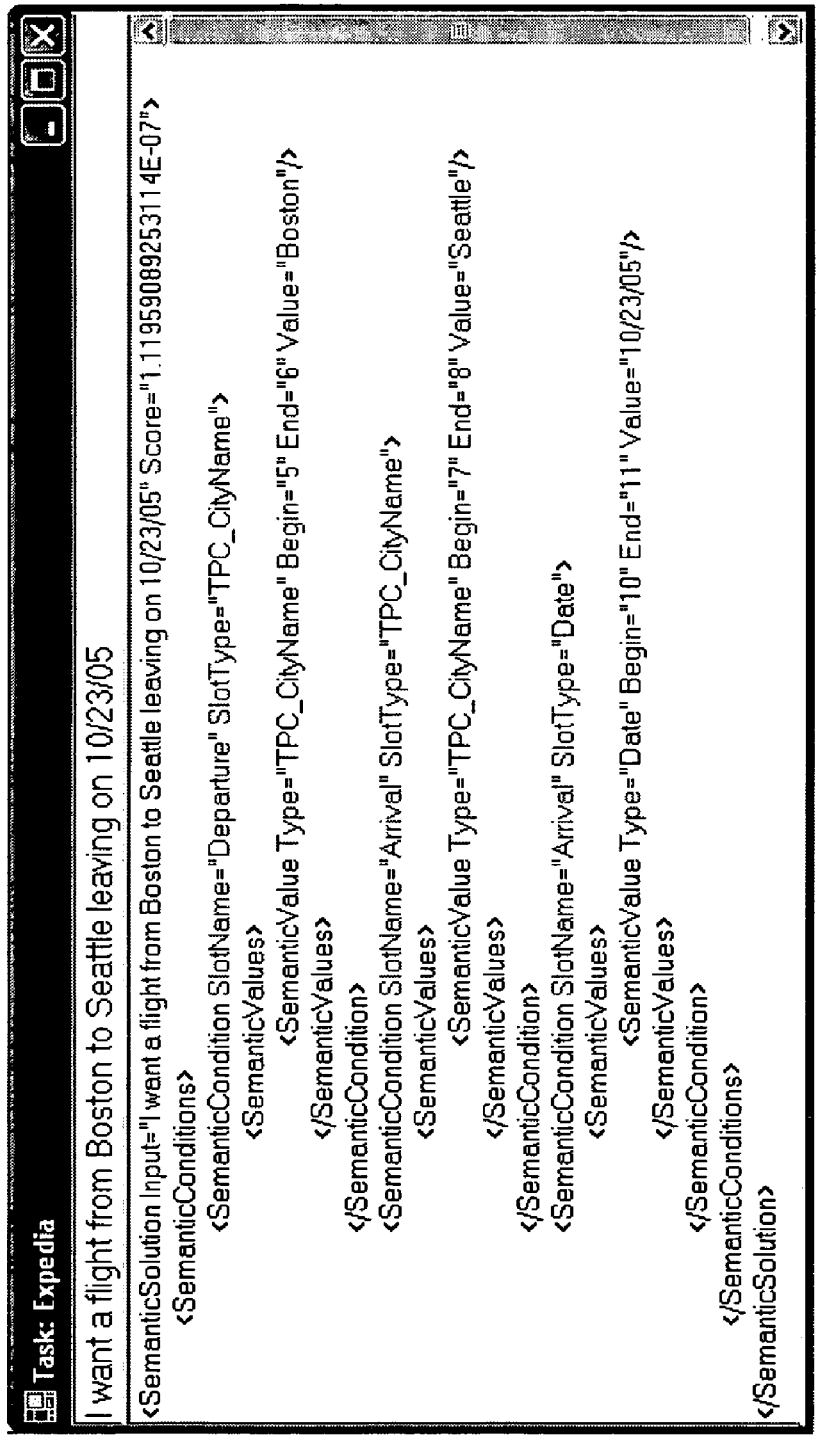
FIG. 6 is an illustration of a semantic representation in accordance with an aspect of the disclosed subject matter.

Referring now to FIG. 6, semantic solutions may be illustrated graphically to aid users and operators in analyzing paths. As can be seen in FIG. 6, the hierarchical, tree structure representation may assist users in recognizing interpretations of natural language input. FIG. 6 illustrates a semantic solution that includes multiple nested semantic conditions.

The post-processor component is independent of other components within the slot-filler system. Consequently, the output format may be modified without requiring modification of the remainder of the components.

The componentized architecture for performing slot-filling described herein allows the slot-filling system to incorporate new and improved mapping, decoder, scoring and post-processor components as new techniques are developed without having to change the remaining portions of the system. During the research, the componentized architecture will facilitate experimenting with multiple algorithms and approaches. After deployment of the slot-filling system, the componentized architecture will allow operators to change the underlying mathematical models without having to make any other changes to the system.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flowcharts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 7:
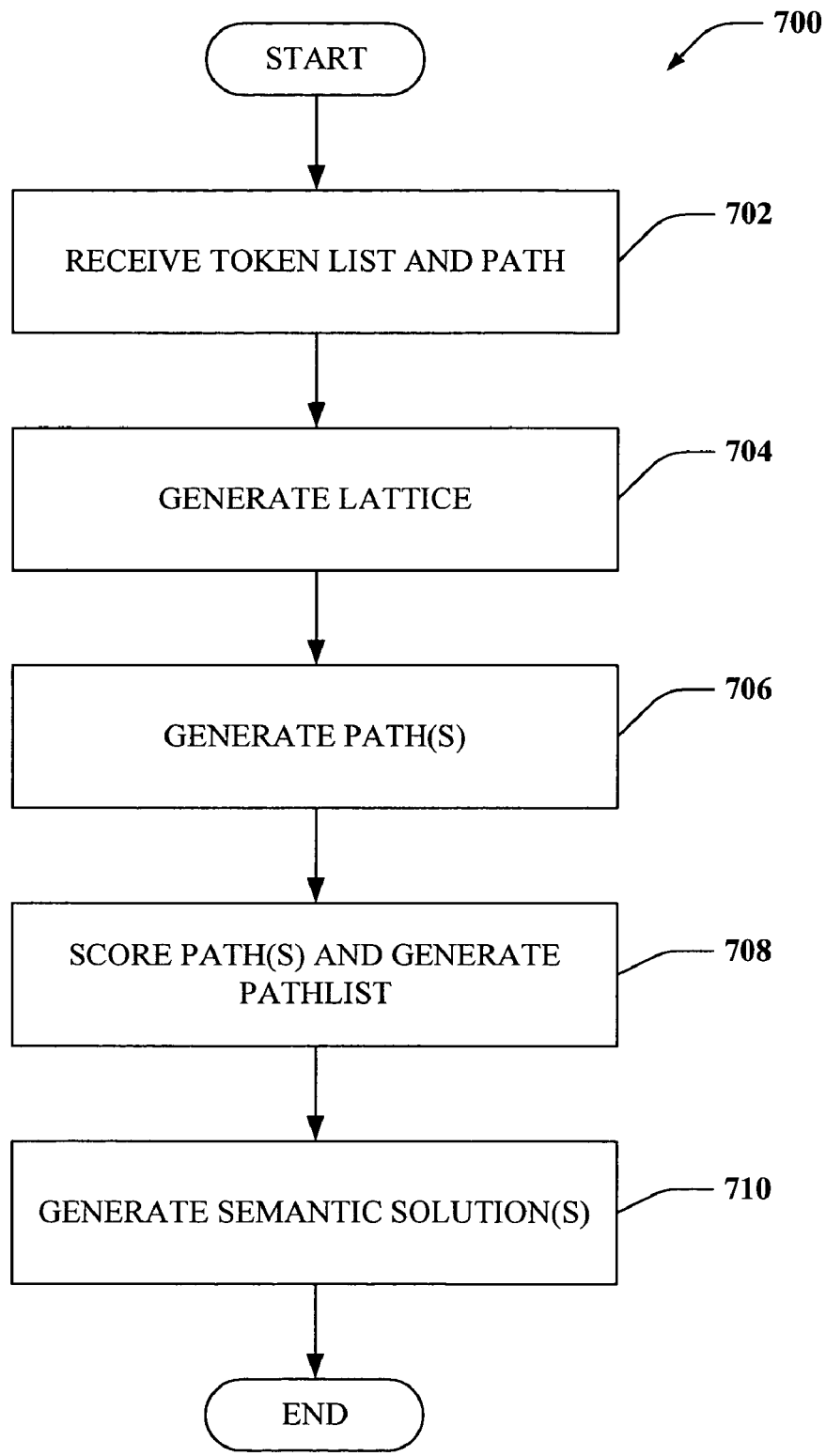
FIG. 7 is an illustration of a methodology for matching natural language input to task parameters in accordance with an aspect of the disclosed subject matter.

FIG. 7 illustrates a methodology 700 for matching natural language input to task parameters in accordance with an aspect presented herein. At 702, a token list and task is received. A lattice that includes all possible interpretations of the tokens contained within the token list is generated at 704. Information related to the specific task may be used during lattice generation. At 706, one or more paths traversing the lattice are generated. Scores or rankings for the one or more paths may be determined at 708 and a path list may be created. The path list may include all of the paths, a subset of the paths or a single path. The score or ranking can be used to determine the path or paths included in the path list and/or the order of the paths in the list. At 710, semantic solutions may be generated for one or more of the paths in the pathlist.

Figure 8:
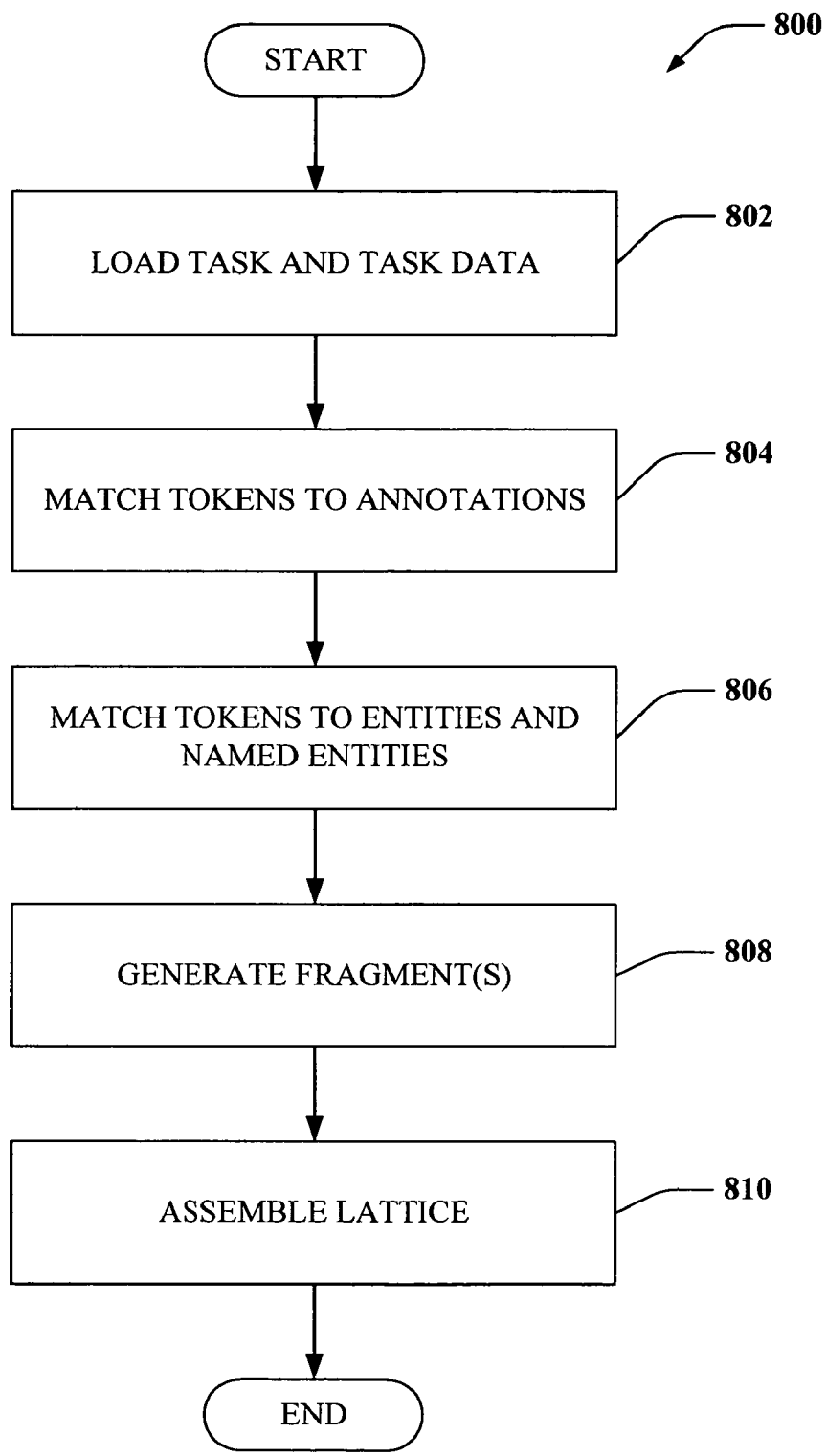
FIG. 8 is an illustration of a methodology for generating a lattice in accordance with an aspect described herein

FIG. 8 illustrates a methodology 800 for generating a lattice in accordance with an aspect described herein. At 802, a task and any associated task metadata is loaded in preparation for processing the token list. The associated task metadata may include named entities for the task. At 804, the tokens in the token list are matched against a set of defined annotations and tokens matching annotations are identified. The tokens are then matched against the entities, named entities and global system entities at 806. At 808, lattice fragments are generated for each token based upon the identification of annotations, entities and based at least in part upon user feedback. At 810, a lattice is assembled from the fragments for each token in the token list.

Figure 9:
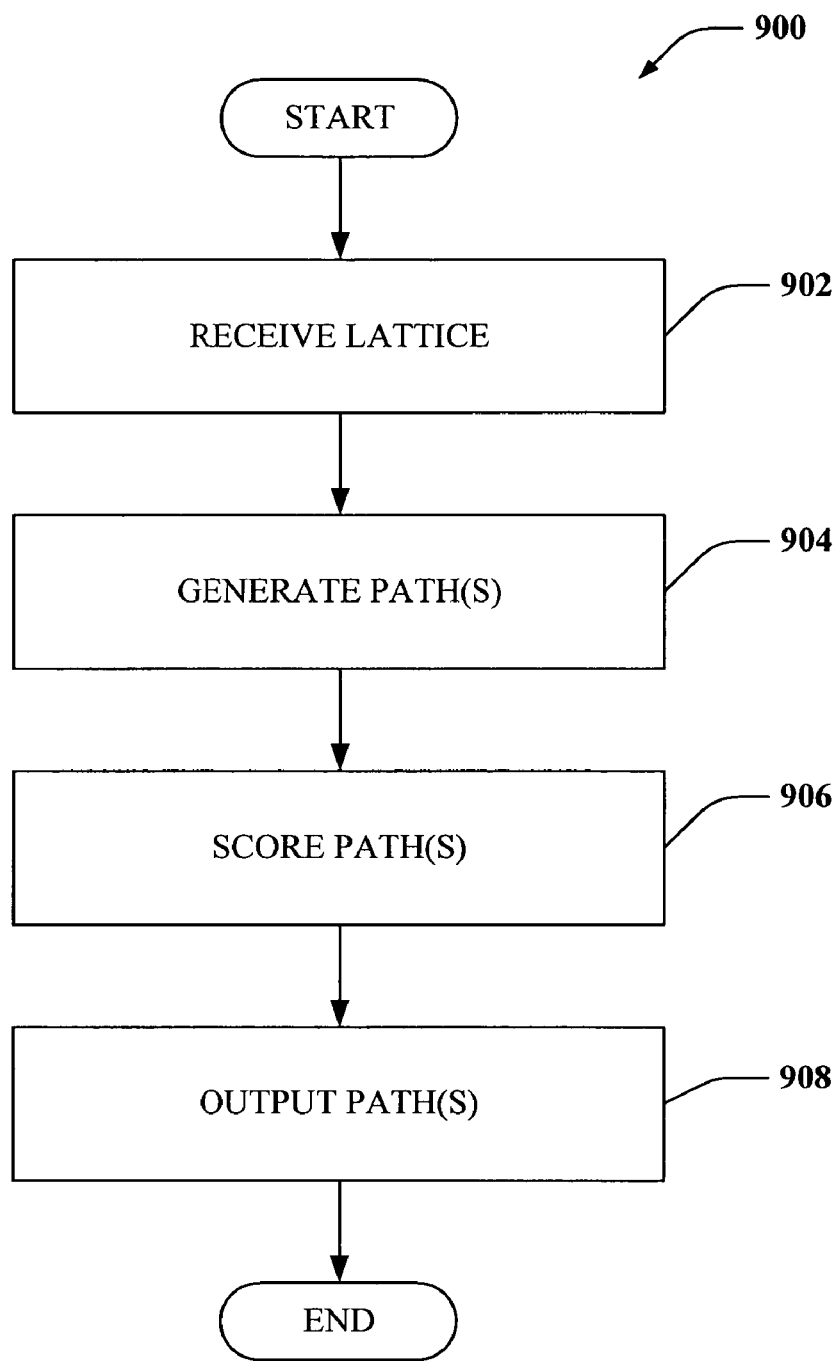
FIG. 9 is an illustration of a methodology for generating one or more paths through a lattice in accordance with an aspect described herein.

FIG. 9 illustrates a methodology 900 for generating one or more paths through a lattice. At 902, a lattice is received. At 904, one or more paths through the lattice are generated. Each of the paths is evaluated and scored at 906. At 908, one or more of the paths is output based at least in part upon the scores associated with each path. If more than one path is output, the paths may be ordered based upon the path score.

Figure 10:
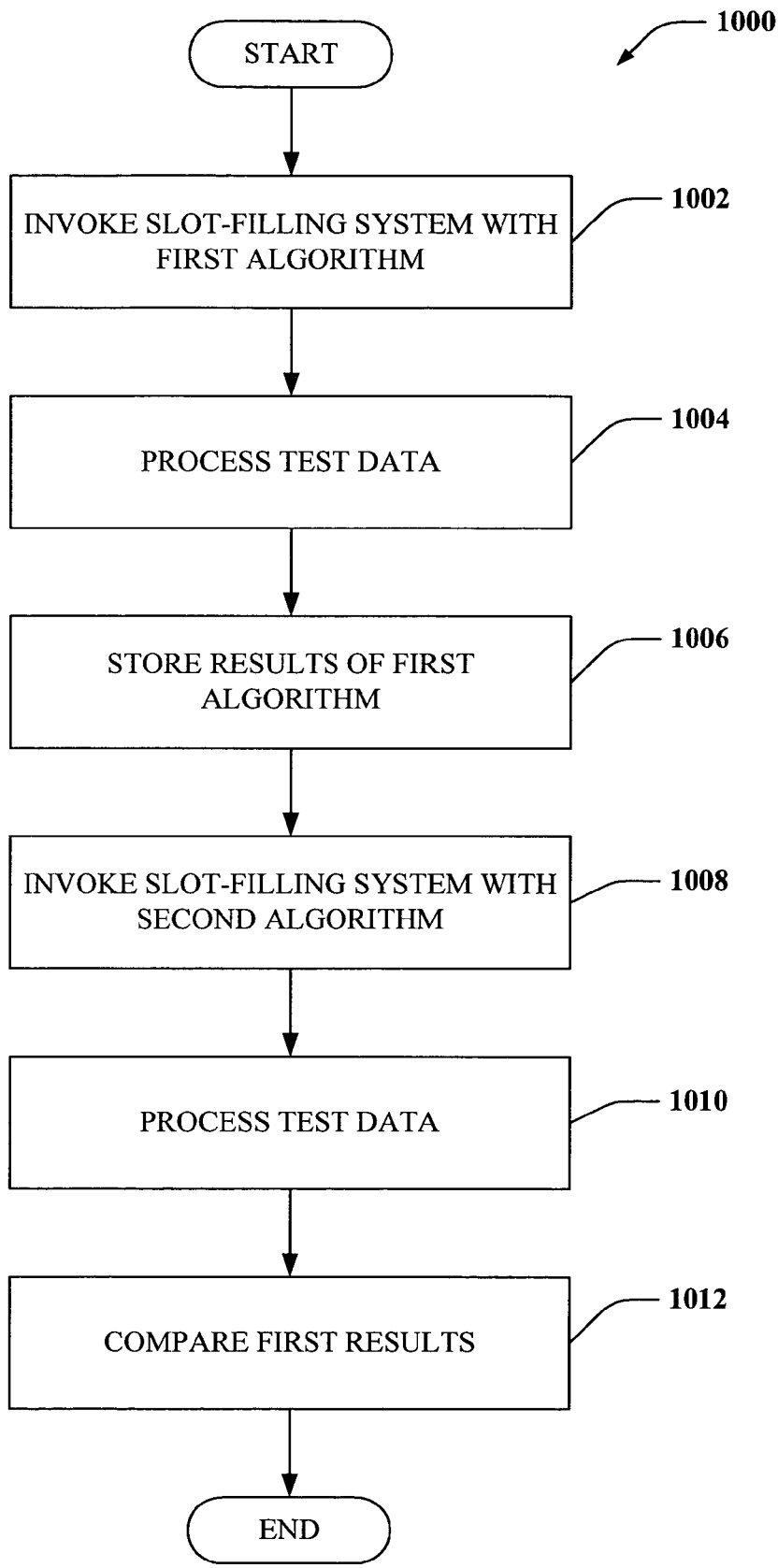
FIG. 10 is an illustration of a methodology 1000 for utilizing a slot-filling system to test different decoding algorithms in accordance with an aspect described herein.

FIG. 10 illustrates a methodology 1000 for utilizing a slot-filling system to test different decoding algorithms for generating pathlists. At 1002, the slot-filling system is invoked with a first algorithm. A test set of data is processed by the slot-filling system at 1004. The results from the first algorithm are stored at 1006. At 1008, the decoder component utilizing the first component is replaced with a decoder component utilizing a second algorithm and the slot-filling system is invoked with a second algorithm. Although, the decoder component is replaced, there is no impact on the mapper component, the scorer component or the post-processing component. The same set of test data is processed by the slot-filling system at 1010. The results from processing the test data utilizing the first algorithm is then compared to the results from processing the test data utilizing the second algorithm at 1012. In this manner, multiple algorithms and number variations and combination may be easily tested and compared to optimize performance of the slot-filling system.

Figure 11:
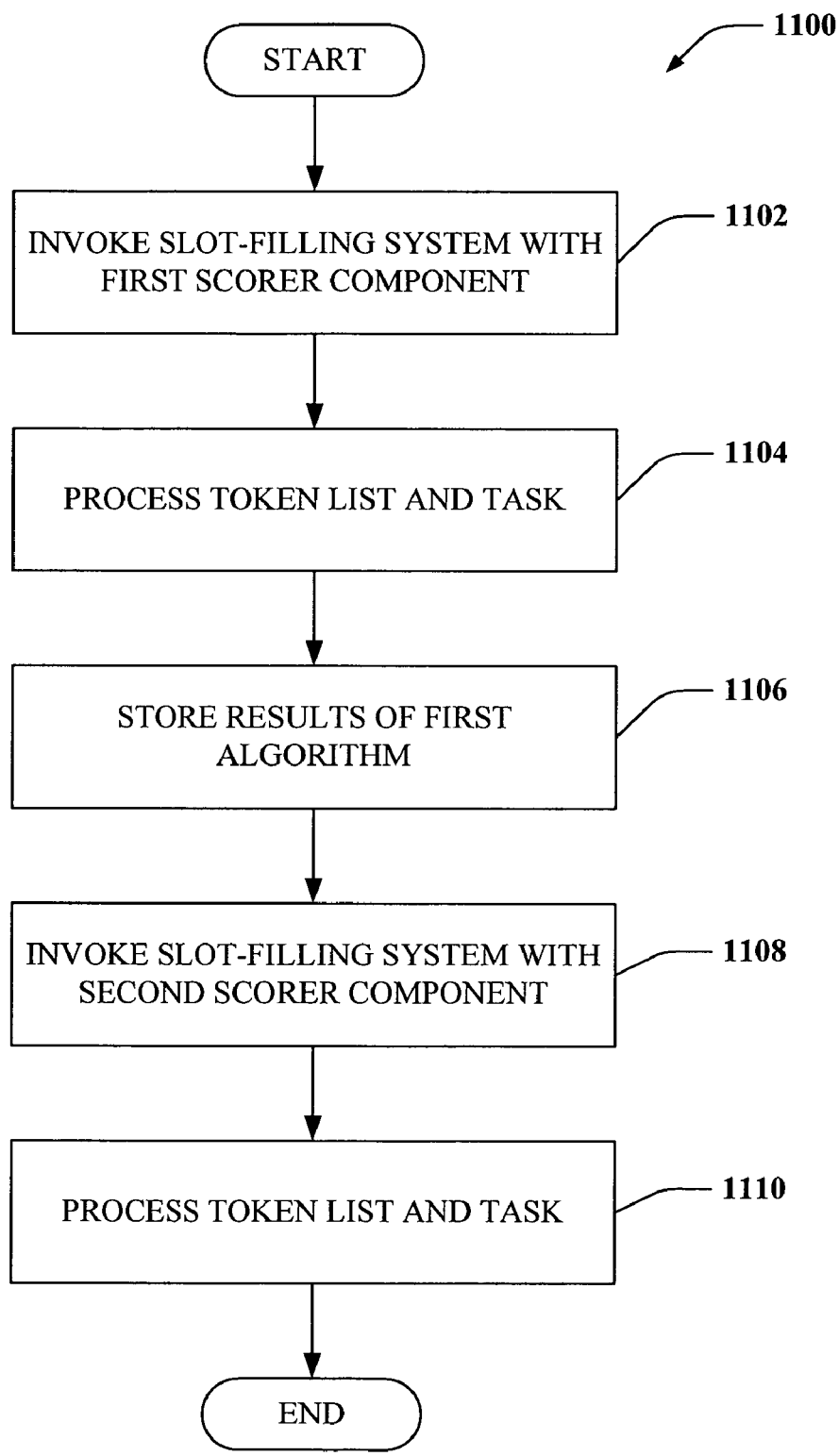
FIG. 11 is an illustration of a methodology 1100 for personalizing the slot-filling system in accordance with an aspect described herein.

FIG. 11 illustrates a methodology 1100 for personalizing a slot-filling system by manipulating the scorer component. A user may wish to reorder the pathlist, expressing a preference for minimizing pathlength. At 1102, the slot-filling system is invoked with a scorer component utilizing a first algorithm. The input token list and task is processed by the slot-filling system at 1104. The results from the first algorithm can be stored at 1106. At 1108, the scorer component utilizing the first component is replaced with a scorer component utilizing a second algorithm and the slot-filling system is invoked with a second algorithm. Although, the scorer component is replaced, there is no impact on the mapper component, the decoder component or the post-processing component. The same token list and task or token lists and tasks can be processed by the slot-filling system at 1110. In the same manner, the mapper component and post-processing component can also be independently replaced.

Figure 12:
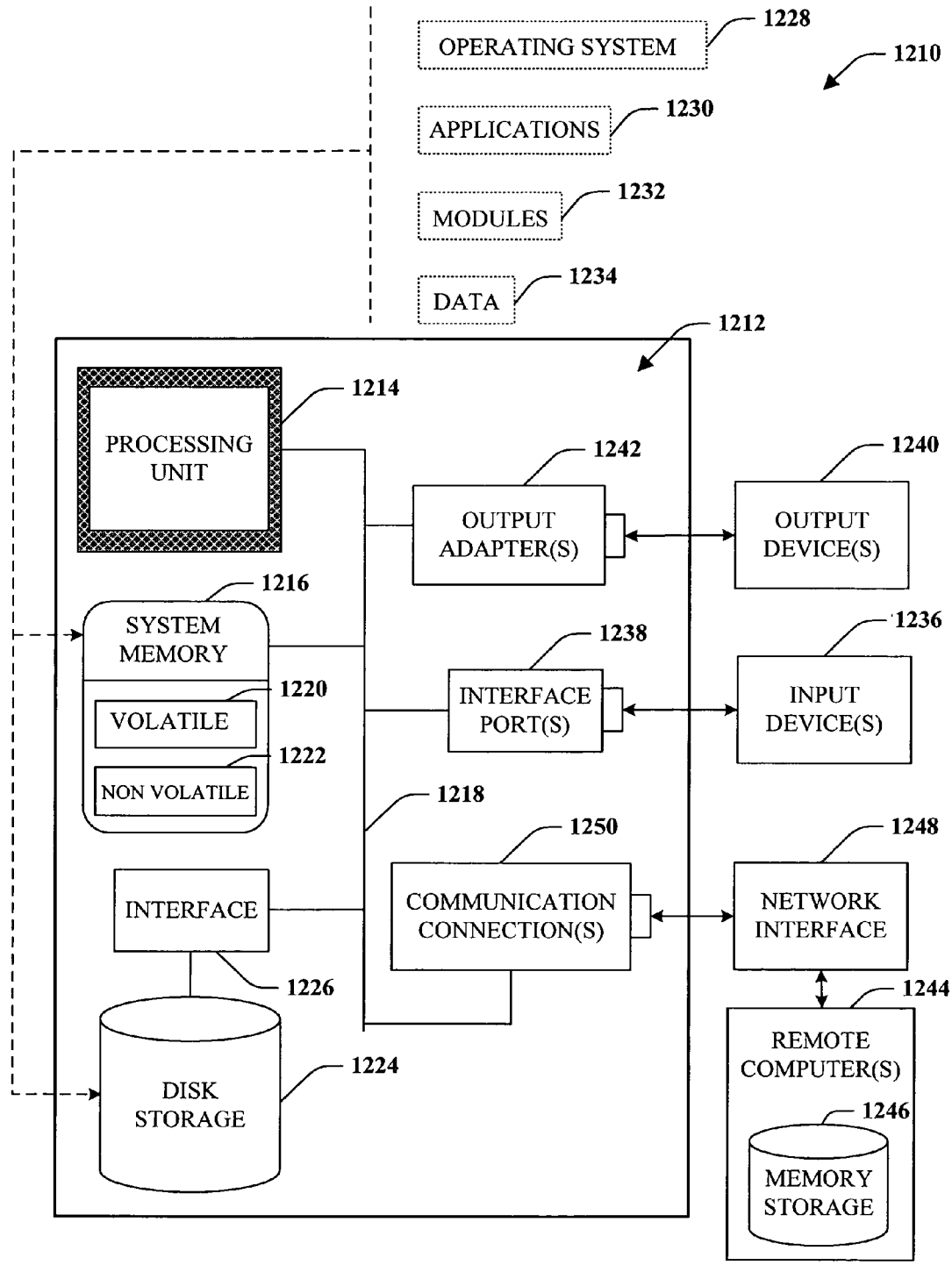
FIG. 12 is a schematic block diagram illustrating a suitable operating environment.
Figure 13:
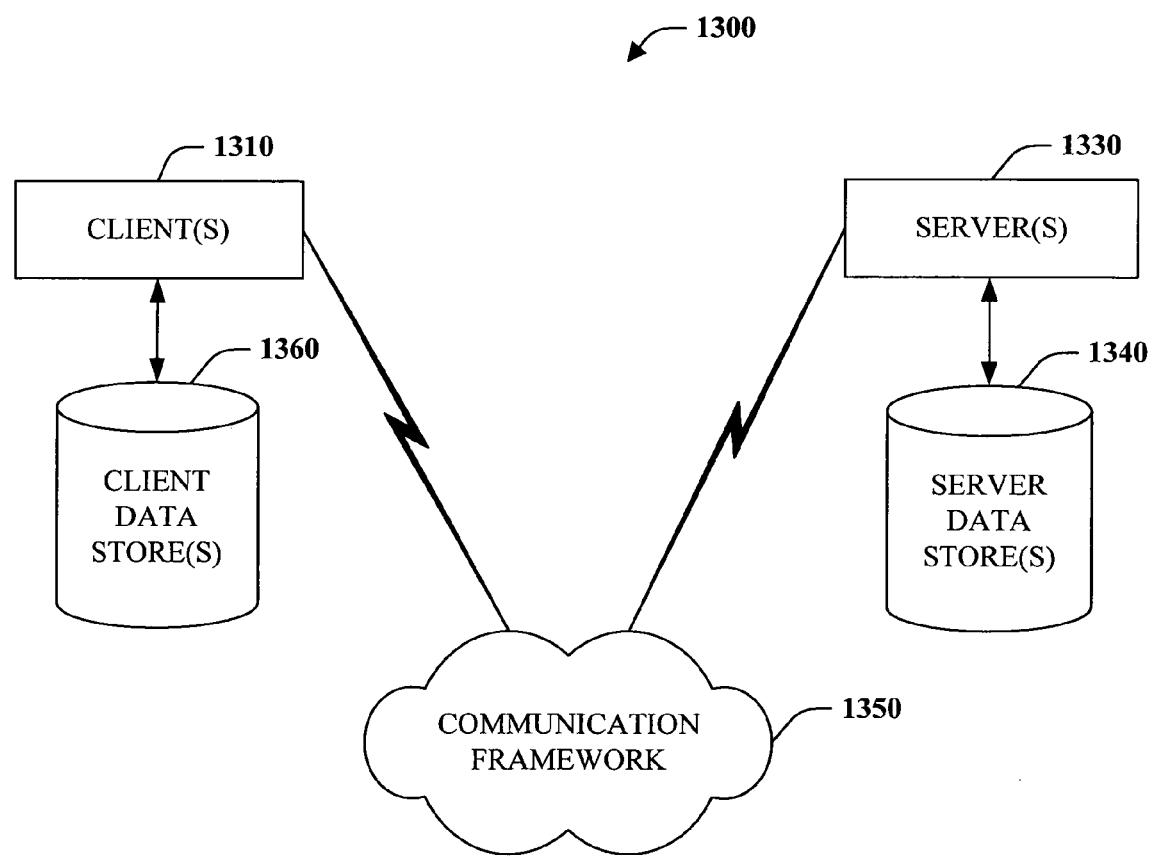
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like displays (e.g., flat panel and CRT), speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection(s) 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems, power modems and DSL modems, ISDN adapters, and Ethernet cards or components.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A natural language processing machine interface system, comprising:
   a mapper component that maps at least one token representing a string of characters broken out of a natural language command entered by a user to a user desired task performed by a downstream computer-implemented software application and generates a lattice that includes at least one interpretation for the at least one token;
   a decoder component that generates at least one path that traverses the lattice, the mapper component and decoder component are independent, such that modification of at least one of the mapper component and the decoder component does not affect the other component; and
   a post-processor component that generates a semantic solution, representing the at least one path, that the downstream software application uses as input data to implement the user desired task, wherein the semantic solution is at least one of stored on a computer readable storage medium, displayed on a display device, or employed by the downstream software application executing on one or more processors.

2. The system of claim 1, further comprising a scorer component that generates a score for the at least one path, the decoder component utilizes the score to rank the at least one path, the scorer component is independent of the mapper component and the decoder component, such that modification of at least one of the mapper component, the decoder component and the scorer component does not affect the other components.

3. The system of claim 2, the scorer component utilizes at least one of a heuristic function, a hidden Markov model, a Naïve Bayes based model, Maximum Entropy/Minimum Divergence Models (MEMD) and linear discriminative models to generate the score for the at least one path.

4. The system of claim 1, the post-processor component is independent of the mapper component and the decoder component, such that modification of at least one of the mapper component, the decoder component and the post-processor component does not affect the other components.

5. The system of claim 4, further comprising a scorer component that generates a score for the at least one path, the decoder component utilizes the score to rank the at least one path and the scorer component is independent of the mapper component, the decoder component and the post-processor component, such that modification of at least one of the mapper component, the decoder component, the post-processor component and the scorer component does not affect the other components.

6. The system of claim 4, the semantic solution is displayed to the user for verification.

7. The system of claim 1, the mapper component utilizes user feedback from prior processing to generate the lattice.

8. The system of claim 1, the decoder component utilizes at least one of beam search, Viterbi search or A* search to generate the at least one path.

9. The system of claim 1, the lattice includes at least one self-describing fragment.

10. A natural language analysis method, comprising:
    mapping at least one token representing a string of characters broken out of a natural language command entered by a user to a user desired task performed by a downstream machine application using a mapper component;
    generating a lattice that includes at least one interpretation of at least one token using the mapper component; and
    generating at least one path that traverses the lattice using a decoder component, the mapper component and decoder component are independent;
    modifying one of the mapper component and the decoder component does not entail modifying the other component; and p1 generating a semantic solution, representing the at least one path, using a post-processor component, the downstream machine application uses the semantic solution as input data to implement the user desired task, wherein the semantic solution is at least one of stored on a computer readable storage medium, displayed on a display device, or employed by the downstream software application executing on one or more processors.

11. The method of claim 10, further comprising:
    generating a score for the at least one path utilizing a scorer component; and
    ranking the at least one path based at least in part upon the score for the at least one path, the scorer component is independent of the mapper component and the decoder component, such that modification of at least one of the mapper component, the decoder component and the scorer component does not affect the other components.

12. The method of claim 11, utilizing at least one of a heuristic function, a hidden Markov model, a Naïve Bayes based model, Maximum Entropy/Minimum Divergence Models (MEMD) and linear discriminative models to generate the score for the at least one path.

13. The method of claim 10, further comprising:
    generating a semantic solution for the at least one path using a post-processor component, the post-processor component is independent of the mapper component and the decoder component, such that modification of at least one of the mapper component, the decoder component and the post-processor component does not affect the other components.

14. The method of claim 13, further comprising:
    displaying the semantic solution for user verification.

15. The method of claim 10, further comprising using user feedback in generating the lattice.

16. The method of claim 10, further comprising:
    utilizing at least one of beam search, Viterbi search or A* search to generate the at least one path.

17. The method of claim 10, the lattice includes at least one self-describing fragment.

18. A natural language system:
    means for mapping at least one token representing a string of characters broken out of a natural language command entered by a user to a user desired task performed by a downstream machine application;
    means for generating a lattice based at least in part upon the at least one token and the task;
    means for generating at least one path that traverses the lattice, the means for mapping and the means for generating at least one path are independent, such that modification of at least one of the means for mapping and the means for generating at least one path does not affect the other component; and
    means for generating a semantic solution, representing the at least one path, that the downstream machine application uses as input data to implement the user desired task, wherein the semantic solution is at least one of stored on a computer readable storage medium, displayed on a display device, or employed by the downstream software application executing on one or more processors.

19. The system of claim 18, further comprising:

means for generating a score for the at least one path; and means for ranking the at least one path based at least in part upon the score for the at least one path, the means for generating a score is independent of the means for mapping and the means for generating at least one path, such that modification of at least one of the means for mapping and the means for generating at least one path and the means for generating a score does not affect the other components.

20. The system of claim 18, means for generating a semantic solution is independent of the means for mapping and the means for generating at least one path, such that modification of at least one of the means for mapping, the means for generating at least one path and the means for generating a semantic solution does not affect the other components.

* * * * *